US010733086B2

(12) United States Patent
Kharitonov et al.

(10) Patent No.: US 10,733,086 B2
(45) Date of Patent: Aug. 4, 2020

(54) METHODS AND SYSTEMS FOR GENERATING A COMBINED METRIC PARAMETER FOR A/B TESTING

(71) Applicant: YANDEX EUROPE AG, Lucerne (CH)

(72) Inventors: Evgeny Vyacheslavovich Kharitonov, Tatarstan (RU); Aleksey Valyerevich Drutsa, Moscow (RU); Pavel Viktorovich Serdyukov, Moscow (RU)

(73) Assignee: YANDEX EUROPE AG, Lucerne (CH)

( * ) Notice: Subject to any disclaimer, the term of this patent is extended or adjusted under 35 U.S.C. 154(b) by 172 days.

(21) Appl. No.: 15/997,231

(22) Filed: Jun. 4, 2018

(65) Prior Publication Data

US 2018/0349258 A1    Dec. 6, 2018

(30) Foreign Application Priority Data

Jun. 6, 2017  (RU) ................................ 2017119737

(51) Int. Cl.
*G06F 11/00* (2006.01)
*G06F 11/36* (2006.01)

(52) U.S. Cl.
CPC ...... *G06F 11/3688* (2013.01); *G06F 11/3672* (2013.01); *G06F 11/3684* (2013.01); *G06F 11/3692* (2013.01)

(58) Field of Classification Search
CPC ............. G06F 11/3688; G06F 11/3672; G06F 11/3684; G06F 11/3692; G06F 11/3664; G06F 11/3668; G06F 11/3616
See application file for complete search history.

(56) References Cited

U.S. PATENT DOCUMENTS 7,698,071 B2    4/2010  Harris
8,396,875 B2    3/2013  Bennett et al.
(Continued)

OTHER PUBLICATIONS

Drutsa et al., "Future User Engagement Prediction and Its Application to Improve the Sensitivity of Online Experiments", IW3C2, 2015, pp. 256-266.
(Continued)

*Primary Examiner* — Joseph D Manoskey
(74) *Attorney, Agent, or Firm* — BCF LLP

(57) ABSTRACT

Methods and systems for generating a combined metric parameter for A/B testing comprising: acquiring a respective first metric parameter for a first and second plurality of feature vectors, a combination of the respective first metric parameters being indicative of a direction of a change in user interactions between the control version and the treatment version, acquiring a respective second metric parameter for the first and second plurality of feature vectors, a combination of the respective second metric parameters being indicative of a magnitude of the change in user interactions between the control and treatment version, generating a respective combined control metric parameter for the first plurality of feature vectors and the second plurality of feature vectors, the combination of the respective combined metric parameters being simultaneously indicative of the magnitude and the direction of the change in user interactions between the control and treatment version.

19 Claims, 3 Drawing Sheets

(56) References Cited

U.S. PATENT DOCUMENTS

2011/0082719 A1    4/2011  Dutta
2016/0253311 A1    9/2016  Xu et al.
2018/0307589 A1*  10/2018  Falkenberg ......... G06F 11/3668

OTHER PUBLICATIONS

Han et al., "A Variance Reduction Framework for Stable Feature Selection", 2010 IEEE International Conference on Data Mining, 2010, pp. 206-215.
Kleijnen, "An Overview of the Design and Analysis of Simulation Experiments for Sensitiviy Analysis", Discussion Paper Center, 2004, No. 2004-16, 33 pages.

* cited by examiner

US 10,733,086 B2

METHODS AND SYSTEMS FOR GENERATING A COMBINED METRIC PARAMETER FOR A/B TESTING

CROSS-REFERENCE

The present application claims priority to Russian Patent Application No. 2017119737, filed on Jun. 6, 2017, entitled "Methods and Systems for Generating a Combined Metric Parameter for A/B Testing," the entirety of which is incorporated herein by reference.

TECHNICAL FIELD

The present technology relates to A/B testing and more precisely to methods and systems for generating a combined metric parameter.

BACKGROUND

In recent years, A/B testing has become the state-of-the-art technique for improving web services based on data-driven decisions. An A/B test compares two variants of a service at a time, usually its current version (a control version or version A) and a new one (a test or treatment version having an experimental treatment applied thereto or version B), by exposing them to two groups of users. They are utilized by many web services providers, including for example search engines, e-commerce sites and social networks, such as Amazon™, eBay'Facebook™, Google™, LinkedIn™, Microsoft™, Netflix™, Yahoo™ and Yandex™. The largest web services have designed special experimental platforms that allow them to run A/B tests at large scale.

One aim of the controlled A/B experiments is to detect the causal effect on user engagement of experimental treatments applied to the web service. A challenging problem is to choose an appropriate criterion applicable in practice, since it has to meet two crucial requirements, which often conflict.

First, the criterion should provide a quantitative value that allows making conclusions about the change in the system's quality, particularly, about the sign of that change. In other words, the value of the criterion must have a clear interpretation and be consistent with user preferences. This criterion is referred to as the directionality or interpretability of the metric. It is known in the art that many criteria may result in contradictory interpretations and their use in practice may be misleading and, therefore, the right choice of an appropriate criterion is a difficult task.

Second, when a treatment effect exists (e.g., effect of modifications on the user behavior), the criterion has to detect the difference of the two versions of the system at a high level of statistical significance in order to distinguish the treatment effect from the noise observed when the effect does not exist. This property is referred to as the sensitivity of the metric. The common problem is the low metric sensitivity in the cases when only a subtle modification is being tested or if only a small amount of user traffic is affected by the system change.

U.S. Pat. No. 8,396,875 titled "Online stratified sampling for classifier evaluation" by Bennett et al. teaches to determine if a set of items belongs to a class of interest, where the set of items is binned into sub-populations based on a score, ranking, or trait associated with each item. The sub-populations may be created based on the score associated with each item, such as an equal score interval, or with the distribution of the items within the overall population, such as a proportion interval. A determination is made of how may samples are needed from each sub-population in order to make an estimation regarding the entire set of items. Then a calculation of the precision and variance for each sub-population is completed and are combined to provide an overall precision and variance value for the overall population.

U.S. Patent Publication No. 2016/253311 titled "Most impactful experiments" by Xu et al. teaches techniques for conducting A/B experimentation of online content. According to various embodiments, a user specification of a metric associated with operation of an online social networking service is received. A set of one or more A/B experiments of online content is then identified, each A/B experiment being targeted at a segment of members of the online social networking service. Thereafter, each of the A/B experiments is ranked, based on an inferred impact on the value of the metric in response to application of a treatment variant of each A/B experiment to the online social networking service. A list of one or more of the ranked A/B experiments is then displayed, via a user interface displayed on a client device.

SUMMARY

Embodiments of the present technology have been developed based on developers' appreciation of at least one technical problem associated with the prior art solutions.

Embodiments of the present technology have been developed based on developers' appreciation that while prior art solutions may be focused on improving sensitivity of a metric, i.e. detecting differences between versions A and B at a high level of statistical significance, the directionality of the metric, i.e. the sign of the detected treatment effect, may be ambiguous.

Therefore, developer(s) have devised method and systems of generating a combined metric parameter for A/B testing.

A combined metric parameter for A/B testing having sensitivity and directionality may be used as an alternative or as a complementary metric parameter for measuring user interactions. Furthermore, a combined metric parameter may be used when individual metric parameters fail to provide a clear preference between tested alternatives.

Furthermore, generating a combined metric parameter having directionality and sensitivity may allow analysts to make decisions when a subtle change of a service is tested, and may allow to optimize processing power and bandwidth usage, as metrics with lower sensitivity require and consume more user traffic to achieve the desired level of sensitivity, which impacts bandwidth usage.

According to a first broad aspect of the present technology, there is provided a computer-implemented method of generating a combined metric parameter, the combined metric parameter usable for executing computer-implemented A/B testing of a computer-implemented service, the computer-implemented service having a control version and a treatment version, the method executed on a server, the method comprising: receiving, by the server, a set of data, the set of data including a first plurality of feature vectors and a second plurality of feature vectors, the first plurality of feature vectors being associated with user interactions of a first plurality of users with the control version of the computer-implemented service during a first time period, and the second plurality of feature vectors being associated with user interactions of a second plurality of users with the treatment version of the computer-implemented service during the first time period, acquiring, by the server, a first control metric parameter for the first plurality of feature vectors and a first treatment metric parameter for the second plurality of feature vectors, a combination of the first control metric parameter and the first treatment metric parameter being at least partially indicative of a direction of a change in user interactions between the control version and the treatment version of the computer-implemented service, the direction being one of a negative direction and a positive direction, acquiring, by the server, a second control metric parameter for the first plurality of feature vectors and a second treatment metric parameter for the second plurality of feature vectors, a combination the second control metric parameter and the second treatment metric parameter being at least partially indicative of a magnitude of the change in the user interactions between the control version and the treatment version of the computer-implemented service, generating, by the server, a combined control metric parameter and a combined treatment metric parameter, the generating comprising: computing by the server, a first weight parameter weighing respectively the first control metric parameter and the first treatment metric parameter and a second weight parameter weighing respectively the second control metric parameter and the second treatment metric parameter, selecting, by the server, a minimal first weight parameter and a maximal second weight parameter, the combined control metric parameter including the first control metric parameter being weighted by the first weight parameter and the second control metric parameter being weighted by the second weight parameter, the combined treatment metric parameter including the first treatment metric parameter being weighted by the first weight parameter and the second treatment metric parameter being weighted by the second weight parameter, the combination of the combined control metric parameter and the combined treatment metric parameter being simultaneously at least partially indicative of the magnitude and the direction of the change in user interactions between the control version and the treatment version of the computer-implemented service during the first time period.

In some implementations, the first weight parameter is indicative of a relative contribution of the first control metric parameter in the combined control metric parameter and the first treatment metric parameter in the combined treatment metric parameter, and the second weight parameter is indicative of a relative contribution of the second control metric parameter in the combined control metric parameter and the second treatment metric parameter in the combined treatment metric parameter.

In some implementations, the method further comprises: applying, by the server, the combined control metric parameter and the combined treatment metric parameter on a new set of data to determine the magnitude and the direction of the change in the user interactions, the new set of data comprising a third plurality of vectors associated with user interactions on a control version of the computer-implemented service during a second time period and a fourth plurality of vectors being associated with user interactions on a treatment version of the computer-implemented service during a second time period.

In some implementations, the magnitude and the direction of the change in the user interactions between the control version and the treatment version of the computer-implemented service during the first time period has a known magnitude and a known direction.

In some implementations, the computing the first weight parameter and the second weight parameter further comprises computing, by the server, for each unit of time in the first time period, a sign of a difference between the first treatment metric parameter and the first control treatment parameter, the sign of the difference being indicative of the direction of the change in the user interactions between the control version and the treatment version of the computer-implemented service, the direction being one of the negative direction and the positive direction, the sign of the difference being defined by:

$$\Delta_i = \text{sign}(M_{1_{Bi}} - M_{1_{Ai}})$$

where $M_{1_{Ai}}$ is the first control metric parameter and $M_{1_{Bi}}$ is the first treatment metric parameter.

In some implementations, the computing the first weight parameter and the second weight parameter further comprises: computing, by the server, for the each unit of the first time period, a weighted z-score based on the combined control metric parameter and the combined treatment metric parameter, the weighted z-score being indicative of a confidence level in the magnitude of the change in the user interactions between the control version and the treatment version of the computer-implemented service, the weighted z-score being defined by:

$$Z_{AB_i}(c_1, c_2) = \frac{c^T \cdot M_{CA}^i - c^T \cdot M_{CB}^i}{\sqrt{c^T \cdot \text{COV}_A^i \cdot c + c^T \cdot \text{COV}_B^i \cdot c}}$$

where c is a weight vector including the first weight parameter $c_1$ and the second weight parameter $c_2$;
$M_{CA}$ is the combined control metric parameter and $M_{CB}$ is the combined treatment metric parameter; and
$\text{COV}_A^i$ is a covariance matrix between the first control metric parameter and the second control metric parameter and $\text{COV}_B^i$ is the covariance matrix between the first treatment metric parameter and the second treatment metric parameter.

In some implementations, the method further comprises summing, for the first time period, the sign of the difference between the first treatment metric parameter and the first control treatment parameter multiplied by the weighted z-score for each unit of time in the first time period.

In some implementations, computing, by the server, the first weight parameter and the second weight parameter further comprises solving:

$$\sum_{i=1}^{N} Z_{AB_i}(c_1, c_2) \cdot \text{sign}(M_{1_{Bi}} - M_{1_{Ai}}) = \frac{\text{avg}(M_{CB}) - \text{avg}(M_{CA})}{\sqrt{\text{var}[\text{avg}(M_{CB}) - \text{avg}(M_{CA})]}}$$

In some implementations, the solving is performed by using one of a Broyden-Fletcher-Goldfard-Shanno (BFGS) algorithm, a gradient based algorithm or a heuristic algorithm.

In some implementations, a sum of the first weight parameter and the second weight parameter is a constant.

In some implementations, the selecting, by the server, the minimal first weight parameter and the maximal second weight parameter comprises selecting an optimal value for the minimal first weight parameter and selecting the maximal second weight parameter by subtracting the first weight parameter from the constant.

In some implementations, the first metric parameter is a daily active users (DAU) measure and the second metric parameter is a click-through rate (CTR) measure.

In some implementations, the first plurality of users is at least a portion of users having interacted with the control version of the computer-implemented service during the first time period.

In some implementations, the second plurality of users is at least a portion of all users having interacted with the treatment version of the computer-implemented service during the first time period.

According to a second broad aspect of the present technology, there is provided a system, A system for generating a combined a combined metric parameter, the combined metric parameter usable for executing computer-implemented A/B testing of a computer-implemented service, the computer-implemented service having a control version and a treatment version, the system comprising: a processor; a non-transitory computer-readable medium comprising instructions, the processor, upon executing the instructions, being configured to cause: receiving a set of data, the set of data including a first plurality of feature vectors and a second plurality of feature vectors, the first plurality of feature vectors being associated with user interactions of a first plurality of users with the control version of the computer-implemented service during a first time period, and the second plurality of feature vectors being associated with user interactions of a second plurality of users with the treatment version of the computer-implemented service during the first time period, acquiring a first control metric parameter for the first plurality of feature vectors and a first treatment metric parameter for the second plurality of feature vectors, a combination of the first control metric parameter and the first treatment metric parameter being at least partially indicative of a direction of a change in user interactions between the control version and the treatment version of the computer-implemented service, the direction being one of a negative direction and a positive direction, acquiring a second control metric parameter for the first plurality of feature vectors and a second treatment metric parameter for the second plurality of feature vectors, a combination the second control metric parameter and the second treatment metric parameter being at least partially indicative of a magnitude of the change in the user interactions between the control version and the treatment version of the computer-implemented service, generating a combined control metric parameter and a combined treatment metric parameter, the generating comprising: computing a first weight parameter weighing respectively the first control metric parameter and the first treatment metric parameter and a second weight parameter weighing respectively the second control metric parameter and the second treatment metric parameter, selecting a minimal first weight parameter and a maximal second weight parameter, the combined control metric parameter including the first control metric parameter being weighted by the first weight parameter and the second control metric parameter being weighted by the second weight parameter, the combined treatment metric parameter including the first treatment metric parameter being weighted by the first weight parameter and the second treatment metric parameter being weighted by the second weight parameter, the combination of the combined control metric parameter and the combined treatment metric parameter being simultaneously at least partially indicative of the magnitude and the direction of the change in user interactions between the control version and the treatment version of the computer-implemented service during the first time period.

In some implementations, the first weight parameter is indicative of a relative contribution of the first control metric parameter in the combined control metric parameter and the first treatment metric parameter in the combined treatment metric parameter, and the second weight parameter is indicative of a relative contribution of the second control metric parameter in the combined control metric parameter and the second treatment metric parameter in the combined treatment metric parameter.

In some implementations, the method further comprises: applying, by the server, the combined control metric parameter and the combined treatment metric parameter on a new set of data to determine the magnitude and the direction of the change in the user interactions, the new set of data comprising a third plurality of vectors associated with user interactions on a control version of the computer-implemented service during a second time period and a fourth plurality of vectors being associated with user interactions on a treatment version of the computer-implemented service during a second time period.

In some implementations, the magnitude and the direction of the change in the user interactions between the control version and the treatment version of the computer-implemented service during the first time period has a known magnitude and a known direction.

In some implementations, the computing the first weight parameter and the second weight parameter further comprises computing, by the server, for each unit of time in the first time period, a sign of a difference between the first treatment metric parameter and the first control treatment parameter, the sign of the difference being indicative of the direction of the change in the user interactions between the control version and the treatment version of the computer-implemented service, the direction being one of the negative direction and the positive direction, the sign of the difference being defined by:

$$\Delta_i = \text{sign}(M_{1_{Bi}} - M_{1_{Ai}})$$

where $M_{1_{Ai}}$ is the first control metric parameter and $M_{1_{Bi}}$ is the first treatment metric parameter.

In some implementations, the computing the first weight parameter and the second weight parameter further comprises: computing for the each unit of the first time period, a weighted z-score based on the combined control metric parameter and the combined treatment metric parameter, the weighted z-score being indicative of a confidence level in the magnitude of the change in the user interactions between the control version and the treatment version of the computer-implemented service, the weighted z-score being defined by:

$$Z_{AB_i}(c_1, c_2) = \frac{c^T \cdot M_{CA}^i - c^T \cdot M_{CB}^i}{\sqrt{c^T \cdot \text{COV}_A^i \cdot c + c^T \cdot \text{COV}_B^i \cdot c}}$$

where c is a weight vector including the first weight parameter $c_1$ and the second weight parameter $c_2$;

$M_{CA}$ is the combined control metric parameter and $M_{CB}$ is the combined treatment metric parameter; and $\text{COV}_A^i$ is a covariance matrix between the first control metric parameter and the second control metric parameter and $\text{COV}_B^i$ is the covariance matrix between the first treatment metric parameter and the second treatment metric parameter.

In some implementations, the method further comprises summing, for the first time period, the sign of the difference between the first treatment metric parameter and the first control treatment parameter multiplied by the weighted z-score for each unit of time in the first time period.

In some implementations, computing the first weight parameter and the second weight parameter further comprises solving:

$$\sum_{i=1}^{N} Z_{AB_i}(c_1, c_2) \cdot \text{sign}(M_{1_{B_i}} - M_{1_{A_i}}) = \frac{\text{avg}(M_{CB}) - \text{avg}(M_{CA})}{\sqrt{\text{var}[\text{avg}(M_{CB}) - \text{avg}(M_{CA})]}}$$

In some implementations, the solving is performed by using one of a Broyden-Fletcher-Goldfard-Shanno (BFGS) algorithm, a gradient based algorithm or a heuristic algorithm.

In some implementations, a sum of the first weight parameter and the second weight parameter is a constant.

In some implementations, the selecting the minimal first weight parameter and the maximal second weight parameter comprises selecting an optimal value for the minimal first weight parameter and selecting the maximal second weight parameter by subtracting the first weight parameter from the constant.

In some implementations, the first metric parameter is a daily active users (DAU) measure and the second metric parameter is a click-through rate (CTR) measure.

In some implementations, the first plurality of users is at least a portion of users having interacted with the control version of the computer-implemented service during the first time period.

In some implementations, the second plurality of users is at least a portion of all users having interacted with the treatment version of the computer-implemented service during the first time period.

In the context of the present specification, unless expressly provided otherwise, an "electronic device", a "user device", a "server", and a "computer-based system" are any hardware and/or software appropriate to the relevant task at hand. Thus, some non-limiting examples of hardware and/or software include computers (servers, desktops, laptops, netbooks, etc.), smartphones, tablets, network equipment (routers, switches, gateways, etc.) and/or combination thereof.

In the context of the present specification, unless expressly provided otherwise, the expression "computer-readable medium" and "storage" are intended to include media of any nature and kind whatsoever, non-limiting examples of which include RAM, ROM, disks (CD-ROMs, DVDs, floppy disks, hard disk drives, etc.), USB keys, flash memory cards, solid state-drives, and tape drives.

In the context of the present specification, unless expressly provided otherwise, the words "first", "second", "third", etc. have been used as adjectives only for the purpose of allowing for distinction between the nouns that they modify from one another, and not for the purpose of describing any particular relationship between those nouns. Thus, for example, it should be understood that, the use of the terms "first server" and "third server" is not intended to imply any particular order, type, chronology, hierarchy or ranking (for example) of/between the server, nor is their use (by itself) intended imply that any "second server" must necessarily exist in any given situation. Further, as is discussed herein in other contexts, reference to a "first" element and a "second" element does not preclude the two elements from being the same actual real-world element. Thus, for example, in some instances, a "first" server and a "second" server may be the same software and/or hardware, in other cases they may be different software and/or hardware.

BRIEF DESCRIPTION OF THE DRAWINGS

For a better understanding of the present technology, as well as other aspects and further features thereof, reference is made to the following description which is to be used in conjunction with the accompanying drawings, where.

DETAILED DESCRIPTION

The present detailed description is intended to be only a description of illustrative examples of the present technology. This description is not intended to define the scope nor set forth the bounds of the present technology. In some cases, helpful examples of modifications may be set forth as an aid to understanding the present technology, and not to define the scope or set forth the bounds of the present technology. These modifications are not an exhaustive list and other modifications are likely possible. Further, where this has not been done (i.e. where no examples of modifications have been set forth), it should not be interpreted that no modifications are possible and/or that what is described is the sole manner of implementing that particular aspect of the present technology. In addition it is to be understood that the present detailed description provides in certain instances simple implementations of the present technology, and that where such is the case they have been presented in this manner as an aid to understanding. Various implementations of the present technology may be of a greater complexity.

With these fundamentals in place, we will now consider some non-limiting examples to illustrate various implementations of aspects of the present technology.

Figure 1:
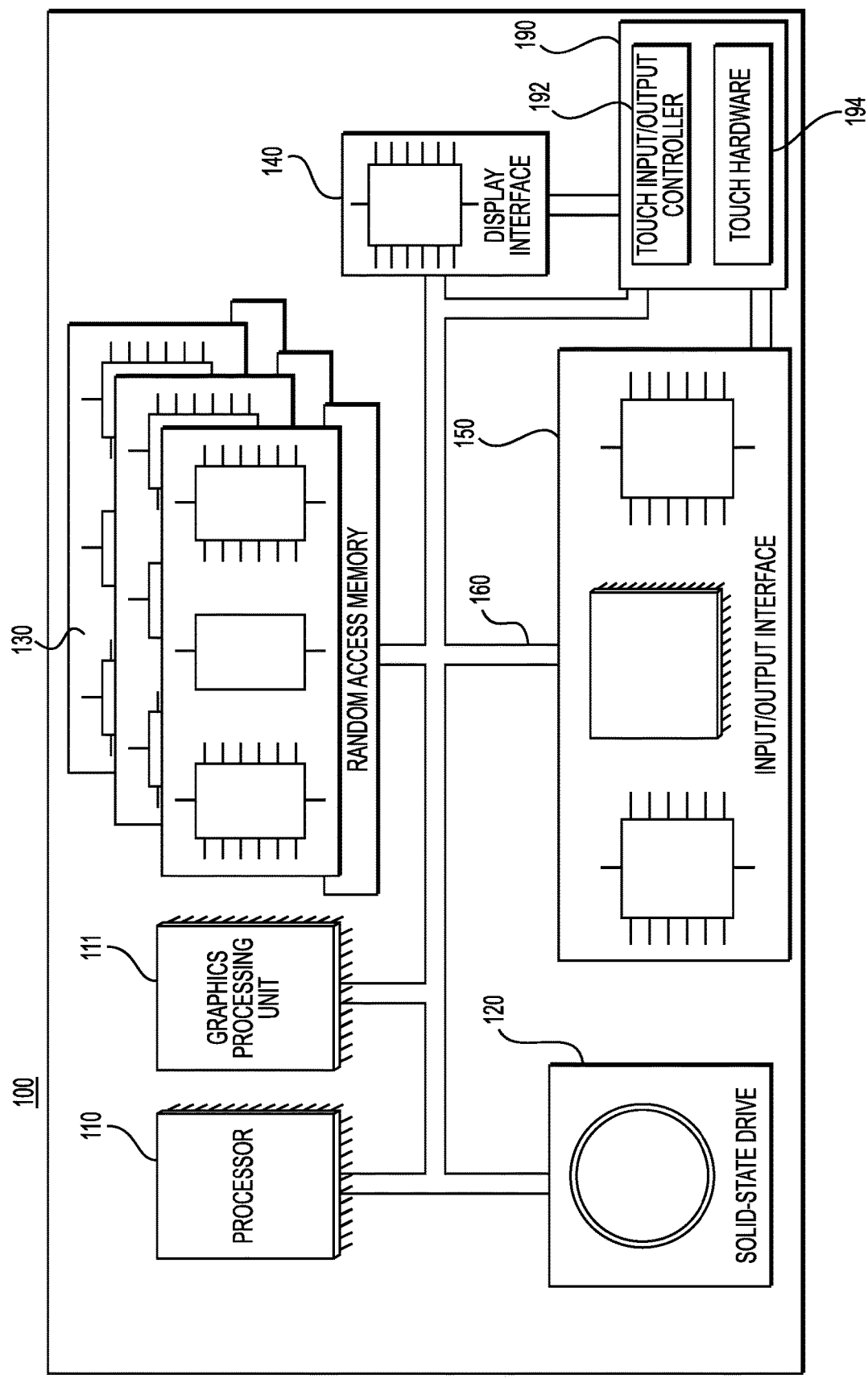
FIG. 1 is a schematic diagram of a non-limiting implementation of client device in accordance with the present technology.

Referring to FIG. 1, there is shown a first client device 100 suitable for use with some implementations of the present technology, the first client device 100 comprising various hardware components including one or more single or multi-core processors collectively represented by processor 110, a graphics processing unit (GPU) 111, a solid-state drive 120, a random access memory 130, a display interface 140, and an input/output interface 150.

Communication between the various components of the first client device 100 may be enabled by one or more internal and/or external buses 160 (e.g. a PCI bus, universal serial bus, IEEE 1394 "Firewire" bus, SCSI bus, Serial-ATA bus, etc.), to which the various hardware components are electronically coupled.

The input/output interface 150 may be coupled to a touchscreen 190 and/or to the one or more internal and/or external buses 160. The touchscreen 190 may be part of the display. In some embodiments, the touchscreen 190 is the display. The touchscreen 190 may equally be referred to as a screen 190. In the embodiments illustrated in FIG. 1, the touchscreen 190 comprises touch hardware 194 (e.g., pressure-sensitive cells embedded in a layer of a display allowing detection of a physical interaction between a user and the display) and a touch input/output controller 192 allowing communication with the display interface 140 and/or the one or more internal and/or external buses 160. In some embodiments, the input/output interface 150 may be connected to a keyboard (not shown), a mouse (not shown) or a trackpad (not shown) allowing the user to interact with the first client device 100 in addition or in replacement of the touchscreen 190.

According to implementations of the present technology, the solid-state drive 120 stores program instructions suitable for being loaded into the random access memory 130 and executed by the processor 110 and/or the GPU 111. For example, the program instructions may be part of a library or an application.

The first client device 100 may be a server, a desktop computer, a laptop computer, a tablet, a smartphone, a personal digital assistant or any device that may be configured to implement the present technology, as should be understood by a person skilled in the art.

Figure 2:
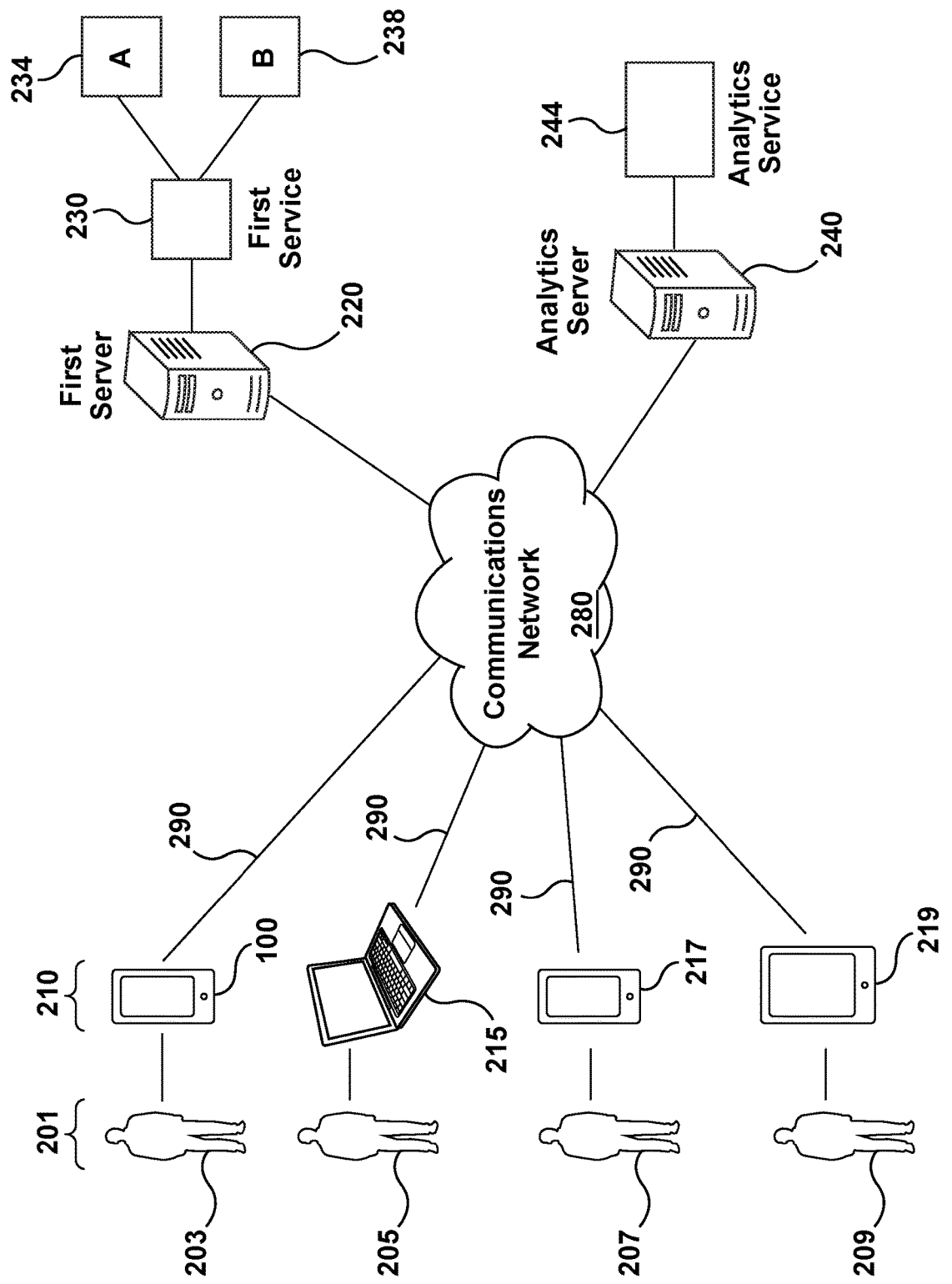
FIG. 2 is schematic diagram of a non-limiting implementation of a communication system in accordance with the present technology.

Now turning to FIG. 2, a communication system 200 is illustrated in accordance with an embodiment of the present technology. The communication system 200 comprises a plurality of users 201, the plurality of users 201 comprising a first user 203, a second user 205, a third user 207 and fourth user 209 respectively associated with the first client device 100, a second client device 215, a third client device 217, and a fourth client device 219 coupled to a communications network 280 via a communication link 290. The first client device 100 may be implemented as a smartphone, the second client device 215 may be implemented as a laptop, the third client device 217 may be implemented as a smartphone and the fourth client device 219 may be implemented as a tablet. In some non-limiting embodiments of the present technology, the communications network 280 can be implemented as the Internet. In other embodiments of the present technology, the communications network 280 can be implemented differently, such as any wide-area communications network, local-area communications network, a private communications network and the like.

How the communication link 290 is implemented is not particularly limited and will depend on how the first client device 100, the second client device 215, the third client device 217 and the fourth client device 219 are implemented. Merely as an example and not as a limitation, in those embodiments of the present technology where at least one of the first client device 100, the second client device 215, the third client device 217 and the fourth client device 219 is implemented as a wireless communication device (such as a smartphone), the communication link 290 can be implemented as a wireless communication link (such as but not limited to, a 3G communications network link, a 4G communications network link, a Wireless Fidelity, or WiFi® for short, Bluetooth® and the like). In those examples, where at least one of the first client device 100, the second client device 215, the third client device 217 and the fourth client device 219 are implemented respectively as laptop, smartphone, tablet computer, the communication link 290 can be either wireless (such as the Wireless Fidelity, or WiFi® for short, Bluetooth® or the like) or wired (such as an Ethernet based connection).

It should be expressly understood that implementations for the first client device 100, the second client device 215, the third client device 217, the fourth client device 219, the communication link 290 and the communications network 280 are provided for illustration purposes only. As such, those skilled in the art will easily appreciate other specific implementational details for the first client device 100, the second client device 215, the third client device 217, the fourth client device 219 and the communication link 290 and the communications network 280. As such, by no means, examples provided herein above are meant to limit the scope of the present technology. While only four client devices 100, 215, 218 and 219 are illustrated (all are shown in FIG. 2), it is contemplated that any number of client devices 100, 215, 218 and 219 could be connected to the communication system 200. It is further contemplated that in some implementations, the number of client devices 100, 215, 218 and 219 included in the communication system 200 could number in the tens or hundreds of thousands.

Also coupled to the communications network is a first server 220 and an analytics server 240. The first server 220 and the analytics server 240 can both be implemented as conventional computer servers. In an example of an embodiment of the present technology, the first server 220 and the analytics server 240 can be implemented as a Dell™ PowerEdge™ Server running the Microsoft™ Windows Server™ operating system. Needless to say, the first server 220 and the analytics server 240 can be implemented in any other suitable hardware and/or software and/or firmware or a combination thereof.

In the depicted non-limiting embodiment of present technology, the first server 220 may host a first service 230. The first service 230 may be any computer-implemented service a user can interact with via an electronic client device (such as one of the first client device 100, the second client device 215, the third client device 217, the fourth client device 219). The computer-implemented service can be a website, including a personal homepage, a social network, an email service, a banking service, etc. In alternative embodiments, the first service 230 may be an app executed on a device such as a smartphone or a tablet acquired from the Apple™ App Store™ or the Google™ Play Store™. In other embodiments, the first service 230 may also be a video, a photo, an email campaign, or a game.

In the present embodiment, the first server 220 may present to each user accessing the first service one of two versions of the first service 230: a control version A 234 or a treatment version B 238. In some embodiments, the first server 220 may present more than two versions of the first service 230, such as a version C (not depicted), a version D (not depicted), etc. The control version A 234 and the treatment version B 238 of the first service 230 may differ in at least some aspect thereof.

In some embodiments, the difference between control version A 234 and treatment version B 238 of the first service 230 may be visual, structural, in content or any combination of visual, structural and content. As a non-limiting example, the color of an element such as a button (not depicted) on treatment version B 238 may be different from the color of the same element on control version A 234, the position or the size of the element on treatment version B 238 may be different from control version A 234, the font of a title may be different on treatment version B 238 than on control version A 234.

In other embodiments, the presentation of more than one element or of the entire page on treatment version B 238 may be different from control version A 234. Often, the control version A 234 will be a version of the first service 230 that has previously been tested for users and for which good user engagement is expected. It is contemplated, however, that the control version A 234 of the first service 230 could be less well-received or tested.

The first server 220 may divide the Internet traffic between control version A 234 and treatment version B 238 of the first service 230, such that users may access one of control version A 234 and treatment version B 238. In some embodiments, every time the first server 220 receives a new request to access the first service 230 from a new user, the first server 220 may alternate between presenting the control version A 234 and the treatment version B 238 to the new user (such as one of the plurality of users 201). In other embodiments, the traffic may be divided between the control version A 234 and the treatment version B 238 based on different parameters associated with the users: estimated age, geographical location, language, personal preferences. In alternative embodiments, users may opt to engage in testing the control version A 234 and the treatment version B 238 of the first service 230.

Generally, the first server 220 may render the control version A 234 and treatment version B 238 of the first service 230 during an experimental period of time, which may last for a predetermined number of days, a number of weeks, a number of months, or a number of years. In the present embodiment, the first client device 100 and the second client device 215 may be assigned to the control version 234 of the first service 230 while the third client device 217 and the fourth client device 219 may be assigned to the treatment version B 238 of the first service 230. As stated previously, the objective of the experiment may be to measure the success or number of conversion on control version A 234 and treatment version B 238 of the first service 230.

During the experimental period, following each client device request from the first client device 100, the second client device 215, the third client device 217 and the fourth client device 219, the client devices may receive and interact with their assigned control version A 234 or treatment version B 238 of the first service 230. Indications of the plurality of interactions of the first client device 100, the second client device 215, the third client device 217 and the fourth client device 219 interacting with their assigned control version A 234 or treatment version B 238 may then be acquired or received by the analytics server 240.

The analytics server 240 may track indications of user interactions with each one of the control version A 234 and treatment version B 238 of the first service 230 via an analytics service 244. Examples of analytics services includes Google™ Analytics™ or Yandex.Metrica™.

As a non-limiting example, the analytics server 240 may track user interactions via the analytics service 244, by way of JavaScript and HTML code embedded in the webpage elements of the first service 230. This may allow acquiring information from HTTP request headers, such as a user's IP address, the URL of the page containing the image, browser and OS information, cookie data, etc.

The JavaScript code may allow acquiring information about the HTML page title, the URL of the traffic source, parameters of the screen and the browser window, browser plug-ins and extensions (Java, Silverlight, Flash), and so on.

Generally, the analytics service 244 may track events that occur while the user is interacting with the page, including filling in and submitting forms, clicking links, scrolling, time spent by the user on pages and page loading parameters (such as rendering time), among others. The analytics service 244 may then generate metric parameters from the tracked user interactions. Metric parameters, also known as metrics or engagement metrics, may refer to a numerical value associated with a user interaction on a version of a service (such as on each one of the control version A 234 and treatment version B 238 of the first service 230). In some embodiments, a metric parameter may directly show the difference between the versions of a service, therefore showing the comparative result between versions of the service (such comparison between the control version A 234 and treatment version B 238 of the first service 230).

Non-limiting examples of metric parameters include:

Sessions: The number of sessions performed by the user during an experiment.

Sessions are defined as interactions with an evaluated web service separated by 30 minutes of inactivity, such that the queries have no word intersection except for words shorter than three characters.

Absence Time: Mean absence time, measured in seconds.

Log Absence Time: Mean logarithmic value of absence time between sessions.

Session Time: Mean session time, measured in seconds.

Log Session Time: Mean logarithmic value of session times.

Queries: The number of queries submitted by a user.

Clicks: The number of clicks performed by a user.

Clicks per Query: The average number of clicks per query for the user.

Click-through rate (CTR): Number of clicks on an element divided by the number of times the element is shown (impressions).

Daily Active Users (DAU): Number of unique users engaging with the service during a day.

Average daily sessions per user (S/U): u S(u) |u|, where S(u) indicates user u's daily session number and |u| is the total number of users on that day.

Average unique queries per session (UQ/S): s UQ(s) |s|, where UQ(s) represents the number of unique queries within session s, and |s| the total number of sessions on that day.

Average session length per user (SL/U): the total number of queries within a session, averaged over each user.

Percentage of navigational queries per user (%-Nav-Q/U): click positions: if over n % of all clicks for a query is concentrated on top-3 ranked URLs, this query is considered to be navigational. Otherwise it is treated as informational. The value of n may be set to 80.

Average query length per user (QL/U): the query length measures the number of words in a user query.

Average query success rate per user (QSuccess/U): a user query is said to be successful if the user clicks one or more results and stays at any of them for more than 30 seconds.

Average query Click Through Rate (CTR): the CTR for a query is 1 if there is one or more clicks, otherwise 0.

Average query interval per user (QI/U): the average time difference between two consecutive user queries within a user session.

Naturally, the above list is non-exhaustive and may include other types of metric parameters without departing from the scope of the present technology.

Broadly speaking, statistical tests may be performed to assess if the results obtained by a given metric parameter are different, i.e. to determine if treatment version B 238 outperforms control version A 234 of the first service 230 on a fixed level of significance for the given metric.

Depending on the assumed distribution of the metric parameter of interest, a different test may be used: e.g. for a Gaussian distribution, Welch's or Student's t-test may be used, for a binomial distribution, Fisher's or Barnard's test may be used, for a Poisson distribution, an E-test or a C-test may be used. A Wilcoxon signed-rank test or a sign test may also be used.

As stated previously, a metric parameter requires two fundamental qualities: sensitivity and directionality.

A statistical significance test may be used to assess if there is a difference in user engagement between the control version A 234 and the treatment version B 238. The larger the absolute value of the resulting z-statistic, the lower the probability or p-value of the null-hypothesis, which assumes that the mean of the two groups are the same and the observed difference is caused by random fluctuations. If the p-value is lower than a threshold, such as the commonly used p<0.05, then the test rejects the null hypothesis and the difference is assumed to be statistically significant.

The sensitivity of a metric parameter may be defined as the ability of the metric parameter to detect a statistically significant difference when the treatment effect exists between control version A 234 and treatment version B 238. A metric parameter showing higher sensitivity may allow detecting smaller changes in the service. A sensitive metric parameter may also allow detecting changes with fewer observations.

The sensitivity of a given metric parameter M may be quantified by the z-score statistic:

$$Z = \frac{\text{avg}(M_A) - \text{avg}(M_B)}{\sqrt{\text{var}[\text{avg}(M_B) - \text{avg}(M_B)]}} \quad (1)$$

Where $\text{avg}(M_A)$, $\text{avg}(M_b)$ are respectively the average of the results for the given metric parameter M of control version A 234 and treatment version B 238, and var [avg $(M_A)$–avg$(M_A)$] is the variance of the difference of the average of the results of the given metric M for control version A 234 and treatment version B 238.

In some embodiments, t-statistics may be used instead of the z-score statistic.

The directionality of the given metric parameter M may be defined as the ability of the metric parameter to show consistent direction when the experiments positively impacts user experience, and show an opposite direction for experiments that negatively impact user experience. The directionality may therefore give a qualitative and binary information about the direction of the metric parameter i.e. the change is positive (+) or negative (–). The directionality may be quantified by the sign of the difference of the results of the given metric parameter M for treatment version B 238 and control version A 234:

$$\Delta = \text{sign}(\text{avg}(M_A) - \text{avg}(M_B)) \quad (2)$$

Where sign( ) is the signum function that extracts the sign of the difference between the average value of a given metric parameter for treatment version B 238 and the average value of the given metric parameter for version A 238.

As stated previously, certain types of metric parameters $M_1$, such as, but not limited to, sessions/user or DAU, may be indicators of directionality, while other types of metric parameters $M_2$, such as, but not limited to CTR, may be indicators of sensitivity.

The objective of the present technology is to generate a combined metric parameter $M_c$ by having a linear combination of two metrics parameters $M_1$ and $M_2$, such that when the combined metric parameter is applied respectively to a control version (i.e. control version A 234) and a treatment version (i.e. treatment version B 238) of a service (i.e. the first service 230), both a magnitude of a change in user interaction and a direction of the change in user interactions between the control version and the treatment version of may be determined.

Such a combined metric parameter $M_c$ may be computed by an approach based on linear discriminant analysis (LDA), a method used to find a linear combination of features that characterizes or separates two or more classes of events. However, other approaches may be used to generate linear combinations of metrics.

First, past user interaction data of users having accessed control version A 234 and treatment version B 238 of the first service 230 during an experimental time period may be acquired or received by the analytics server 240. The user interaction data may be acquired in the form of vectors, which may have as elements values for different metrics, with different vectors for the control version A 234 and the treatment version B 238. The past interaction data of users having accessed the control version A 234 and treatment version B 238 of the first service 230 may be acquired by the analytics server 240 from the first server 220 or from a database or memory (not depicted) of the analytics server 240. In some embodiments, the user interaction data may be acquired continuously from the plurality of client devices 210 when there is an interaction with control version A 234 and treatment version B 238 of the first service 230.

As a non-limiting example, 200 vectors for control version A 234 and treatment version B 238 may be acquired, each having values for a first metric parameter $M_1$ (being instrumental into indicating directionality e.g. DAU) and a second metric parameter $M_2$ (being instrumental into indicating sensitivity e.g. CTR), among others. As an example, each one of the 200 vectors may correspond to a different day in the A/B experimental period. To learn the combined metric parameter $M_C$, the experiment during the experimental time period must have a known preference outcome in terms of directionality and magnitude (i.e. it is known that control version A 234 is more successful than treatment version B 238 or treatment version B 238 is more successful than control version A 234).

Continuing with the previous example, the objective, based on the LDA method, is to find a linear combination of metrics $M_c = c_1 \cdot M_1 + c_2 \cdot M_2$ that is instrumental into indicating sensitivity (magnitude of a change in the user interaction between control version A 234 and treatment version B 238) and directionality (direction of the change in the user interaction between control version A 234 and treatment version B 238) when used as a metric parameter on control version A 234 and treatment version B 238. In other words, the dimensionality may be reduced from two metrics parameters ($M_1$, $M_2$) to one combined metric parameter ($M_c$). The objective of the LDA method is to project 2D data onto a 1D axis by maximizing the distance between the projected means while keeping the scatter or variance minimal or constant.

The combined metric parameter $M_c$ may be found by optimizing the first weight parameter $c_1$ and the second weight parameter $c_2$, each respectively weighing the relative contribution of the first metric $M_1$ and the second metric $M_2$ in the combined metric parameter $M_c$. In the present example, the combined metric parameter may be expressed by $$M_c = c_1 \cdot \text{DAU} + c_2 \cdot \text{CTR}.$$

The combined metric parameter $M_c$ (being a linear combination) may also be understood as being a hyperplane separating data points representing control version A 234 and treatment version B 238 when plotted on a 2D graph with metrics $M_1$ (DAU) and $M_2$ (CTR) as axes. The vector c comprising the first weight parameter $c_1$ and $c_2$ that optimally separates control version A 234 and treatment version B 238 may then be found.

To find the optimal weight parameters $c_1$ and $c_2$, the following parameters for each day i=1 . . . 200 may be calculated:

| | |
|---|---|
| $avg_A^i$ (DAU) | $avg_B^i$ (DAU) |
| $avg_A^i$ (CTR) | $avg_B^i$ (CTR) |
| $COV_A^i$ (DAU, CTR) | $COV_B^i$ (DAU, CTR) |

Where avg is the average of the given metric, and COV is a covariance matrix.

Next, for each day i, the weighted Z-score of the combined metric parameter $M_c$ may be computed:

$$Z_{AB_i}(c_1, c_2) = \frac{c^T \cdot M_{CA}^i - c^T \cdot M_{CB}^i}{\sqrt{c^T \cdot COV_A^i \cdot c + c^T \cdot COV_B^i \cdot c}} \quad (3)$$

Broadly speaking, the weighted z-score may be indicative of a sensitivity of the combined metric parameter $M_c$ in detecting a change in the user interactions between the control version A 234 and the treatment version B 238 of the first service 230.

Generally, using Lagrange multipliers, $c \propto (COV_A^i + COV_B^i + \epsilon I)^{-1} \cdot (M_{CA} - M_{CB})$ Where $\epsilon$ is a small constant (e.g. $\epsilon$=0.1) and I is the identity matrix.

Then, the weighted z-score for a given day i may be multiplied by the sign of the difference to obtain the magnitude and the direction of the change in user interaction for the given day i.

$$Z_{AB_i}(c_1, c_2) \cdot \text{sign}(DAU_B - DAU_A) = \quad (4)$$
$$\frac{c^T \cdot M_{CA}^i - c^T \cdot M_{CB}^i}{\sqrt{c^T \cdot COV_A^i \cdot c + c^T \cdot COV_B^i \cdot c}} \cdot \text{sign}(DAU_B - DAU_A)$$

Where c is a vector including the first and second weight parameters $c_1$ and $c_2$, $M_{CA}=c_1 \cdot DAD_A+c_2 \cdot CTR_A$, $M_{CB}=c_1 \cdot DAU_B+c_2 \cdot CTR_B$, and sign( ) is the signum function that extracts the sign of the difference between the DAUs of treatment version B 238 and control version A 234.

Next, to obtain the total magnitude of the change and the direction of the change in user interaction for the entire experimental time period, the weighted z-score multiplied by the sign of the difference between the DAUs of treatment version B 238 and version 234 may be summed for i=1 . . . 200 (unweighted) z-score of the combined metric parameters:

$$\sum_{i=1}^{200} Z_{AB_i}(c_1, c_2) = \frac{avg(M_{CB}) - avg(M_{CA})}{\sqrt{var[avg(M_{CB}) - avg(M_{CA})]}} \quad (5)$$

Then, using optimization methods such as Broyden-Fletcher-Goldfard-Shanno (BFGS) or gradient based methods, possible solutions for the first weight parameter $c_1$ and the second weight parameter $c_2$ may be computed.

Generally, the sum of the weights $c_1+c_2$ may be a constant e.g. $c_1+c_2=1$, and $c_2>c_1$.

The optimal result may then be chosen to minimize the first weight parameter $c_1$ such that it maintains the relative contribution, in the combined metric parameter $M_c$, of the metric parameter instrumental in indicating directionality $M_1$. The value of the second weight parameter $c_2$ may then be obtained by subtracting the first weight parameter $c_1$ from the constant, e.g. $c_2=1-c_1$.

Broadly speaking, the minimization process of the first weight parameter $c_1$ (as well as the maximization of the second weight parameter $c_2$) may be performed based on a plurality of techniques. A geometric approach; where the minimum and/or maximum of a weight parameter is determined geometrically based on a distribution pattern of the parameter; a deterministic method and/or a stochastic method. Generally, stochastic methods may be combined with deterministic methods, for example, using a coordinate-wise descent method, where the direction of descent may be determined randomly. The probabilistic characteristics of the stochastic parameters, in turn, may be changed from iteration to iteration (e.g. search with adaptation and "self-learning" random search). Based on the techniques and methods listed above (which are illustrative examples only), the minimization of the first weight parameter $c_1$ and the maximization of the second weight parameter $c_2$ may be performed as a parallel iterative computational process. The parallel iterative computational process may choose pairs of possible weight parameters $c_1$ and $c_2$ and iteratively determine the minimum possible first weight parameter $c_1$ paired with the maximum possible second weight parameter $c_2$ and vice versa.

The relative contribution values of each one of the first weight parameter $c_1$ and the second weight parameter $c_2$ in the combined metric combined metric parameter $M_c$ are not limited, as long as the first weight parameter $c_1$ is minimized while preserving its relative contribution e.g. $c_1/c_2$ may be 0.05/0.95, 0.2/0.8, 0.5/0.5, 0.6/0.4, 0.95/0.05 or any other suitable contribution value.

As a non-limiting example, a first weight parameter of $c_1$=0.3 may be found, and $c_2$ may be determined to be $c_2=1-c_1=1-0.3=0.7$.

The combined metric parameter $M_c$ for a given user on a version of the first service 230 (such as control version A 234 or treatment version B 238) may then be expressed as $M_c(u)=0.3 \cdot DAU(u)+0.7 \cdot CTR(u)$, $M_c(u)$ being a new metric preserving the contribution of the two known metrics $M_1$, $M_2$ in the combined metric parameter $M_c$, and therefore being instrumental into indicating simultaneously sensitivity and directionality.

Subsequently, during a new phase of experimentation, the DAU and CTR metrics for new users of each one of control version A 234 and treatment version B 238 of the first service may be acquired and directly weighted to obtain a new metrics $M_{CA}$ and $M_{CB}$, y. After applying statistical testing, the result obtained from the comparison of metrics $M_{CA}$ and $M_{CB}$ may simultaneously indicate the direction and the magnitude of the change in user behavior between control version A 234 and treatment version B 238 of the first service 230.

Furthermore, in a similar manner, it is possible for the combined metric parameter to combine a plurality of metrics, e.g. three or four metrics.

Figure 3:
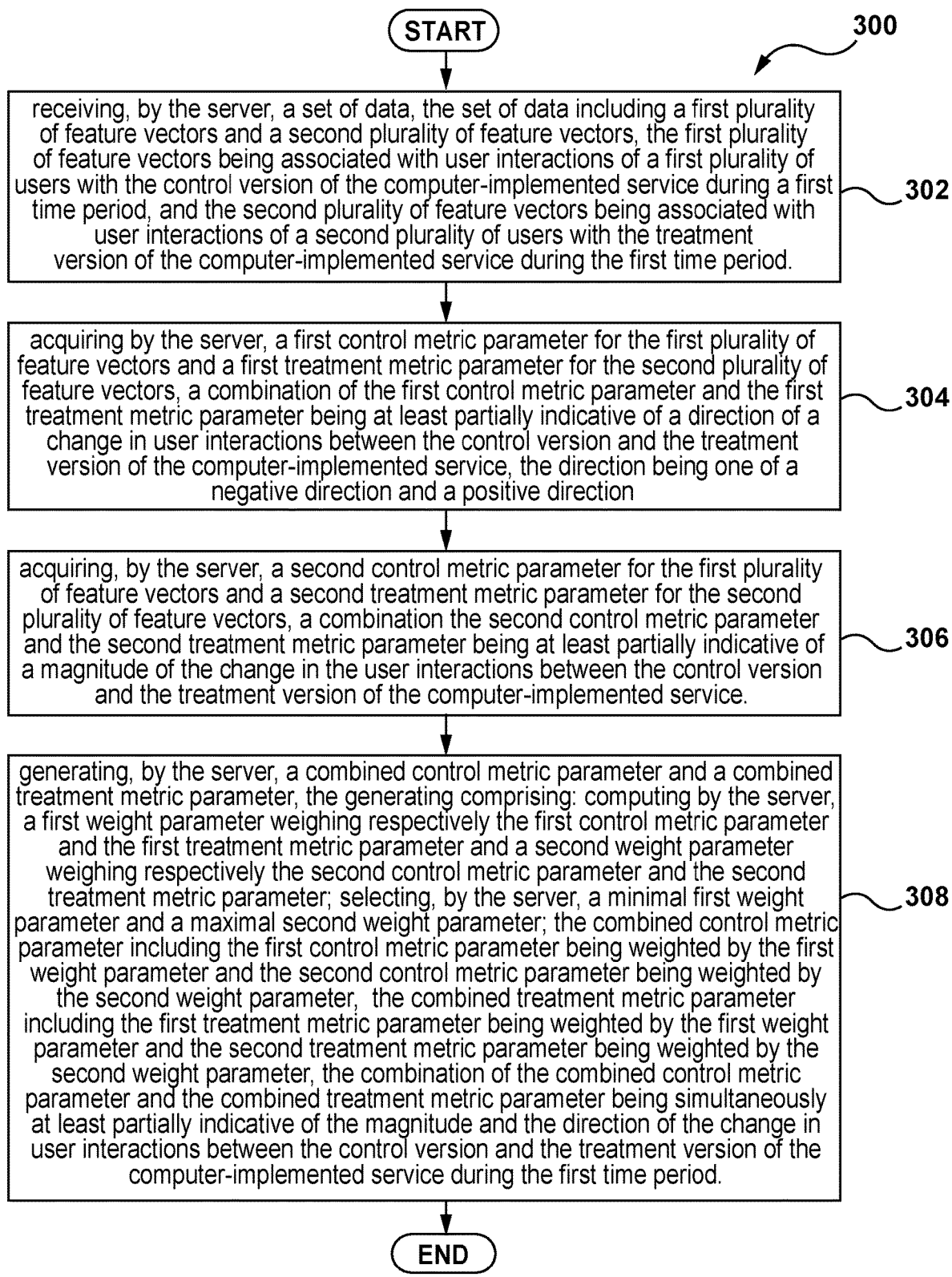
FIG. 3 is a flowchart illustrating the non-limiting implementation of the computer-implemented method for combining metrics for a/b testing in accordance with the present technology.

Now turning to FIG. 3, a flowchart of a method 300 of generating a combined metric parameter is illustrated.

The method 300 may start at step 302.

STEP 302: receiving, by the server, a set of data, the set of data including a first plurality of feature vectors and a second plurality of feature vectors, the first plurality of feature vectors being associated with user interactions of a first plurality of users with the control version of the computer-implemented service during a first time period, and the second plurality of feature vectors being associated with user interactions of a second plurality of users with the treatment version of the computer-implemented service during the first time period.

At step 302, the analytics server 240 may receive a set of data, the set of data including a first plurality of feature vectors and a second plurality of feature vectors, the first plurality of feature vectors being associated with user interactions of a first plurality of users with the control version A 234 of the first service 230 during a first time period, and the second plurality of feature vectors being associated with user interactions of a second plurality of users with the treatment version B 238 of the first service 230 during the first time period. In some embodiments, the first plurality of users may be at least a portion of all users having interacted with the control version A 234 of the first service 230 during the first time period, and the second plurality of users may be at least a portion of all users having interacted with the treatment version B 238 of the first service 230 during the first time period. Broadly speaking, the first plurality of users and the second plurality of users may only be a portion of all users having respectively interacted with the control version A 234 and the treatment version B 238 for a variety of reasons: user interaction data may be incomplete, lost, corrupt, etc. The set of data may be received or acquired by the analytics service 244 of the analytics server 240 from the first server 220 hosting the first service 230 at the same time or at various times.

The method 300 may then advance to step 304.

STEP 304: acquiring by the server, a first control metric parameter for the first plurality of feature vectors and a first treatment metric parameter for the second plurality of feature vectors, a combination of the first control metric parameter and the first treatment metric parameter being at least partially indicative of a direction of a change in user interactions between the control version and the treatment version of the computer-implemented service, the direction being one of a negative direction and a positive direction At step 304, the analytics server 240 may acquire a first control metric parameter $M_{1A}$ for the first plurality of feature vectors and a first treatment metric parameter $M_{1B}$ for the second plurality of feature vectors, a combination of the first control metric parameter and the first treatment metric parameter being at least partially indicative of a direction of a change in user interactions between the control version A 234 and the treatment version B 238 of the first service, the direction being one of a negative direction and a positive direction.

The first control metric parameter $M_{1A}$ and the first treatment metric parameter $M_{1B}$ may be computed based on respectively the first plurality of feature vectors and the second plurality of feature vectors, or may be elements of the respective feature vectors. Generally, the first control metric parameter $M_{1A}$ and the first treatment parameter $M_{1B}$ may be the same metric parameter $M_1$ applied respectively to the control version A 234 and the treatment version B of the first service 230. As a non-limiting example, the first control metric parameter may be $DAU_A$ and the first treatment metric parameter may be $DAU_B$.

The method 300 may then advance to step 306.

STEP 306: acquiring, by the server, a second control metric parameter for the first plurality of feature vectors and a second treatment metric parameter for the second plurality of feature vectors, a combination the second control metric parameter and the second treatment metric parameter being at least partially indicative of a magnitude of the change in the user interactions between the control version A 234 and the treatment version B 238 of the first service 230.

At step 306, the analytics server 240 may acquire a second control metric parameter $M_{2A}$ for the first plurality of feature vectors and a second treatment metric parameter $M_{2B}$ for the second plurality of feature vectors, a combination of the second control metric parameter and the second treatment metric parameter being at least partially indicative of a magnitude of the change in the user interactions between the control version A 234 and the treatment version B 238 of the first service 230.

The second control metric parameter $M_{2A}$ and the second treatment metric parameter $M_{2B}$ may be computed based on respectively the first plurality of feature vectors and the second plurality of feature vectors, or may be elements of the respective feature vectors. Generally, the second control metric parameter $M_{2A}$ and the second treatment parameter may be the same metric parameter $M_2$ applied respectively to the control version A 234 and the treatment version B of the first service 230. As a non-limiting example, the second control metric parameter may be $CTR_A$ and the second treatment metric parameter may be $CTR_B$.

The method 300 may then advance to step 308.

STEP 308: generating, by the server, a combined control metric parameter and a combined treatment metric parameter, the generating comprising: computing by the server, a first weight parameter weighing respectively the first control metric parameter and the first treatment metric parameter and a second weight parameter weighing respectively the second control metric parameter and the second treatment metric parameter; selecting, by the server, a minimal first weight parameter and a maximal second weight parameter; the combined control metric parameter including the first control metric parameter being weighted by the first weight parameter and the second control metric parameter being weighted by the second weight parameter, the combined treatment metric parameter including the first treatment metric parameter being weighted by the first weight parameter and the second treatment metric parameter being weighted by the second weight parameter, the combination of the combined control metric parameter and the combined treatment metric parameter being simultaneously at least partially indicative of the magnitude and the direction of the change in user interactions between the control version and the treatment version of the computer-implemented service during the first time period.

At step 308, the analytics server 240 may generate a combined control metric parameter $M_{CA}$ and a combined treatment metric parameter $M_{CB}$, the generating comprising: computing, by the analytics server 240, a first weight parameter $c_1$ weighing respectively the first control metric parameter $M_{1A}$ and the first treatment metric parameter $M_{1B}$ and a second weight parameter $c_2$ weighing respectively the second control metric parameter $M_{2A}$ and the second treatment metric parameter $M_{2B}$, selecting, by the analytics server 240, a minimal first weight parameter $c_1$ and a maximal second weight parameter $c_2$; the combined control metric parameter including the first control metric parameter being weighted by the first weight parameter and the second control metric parameter being weighted by the second weight parameter $M_{CA}=c_1 \cdot M_{1A} + c_2 \cdot M_{2A}$, the combined treatment metric parameter including the first treatment metric parameter being weighted by the first weight parameter and the second treatment metric parameter being weighted by the second weight parameter, $M_{CB}=c_1 \cdot M_{1B}+c_2 \cdot M_{2B}$, the combination of the combined control metric parameter $M_{CA}$ and the combined treatment metric parameter $M_{CB}$ being simultaneously at least partially indicative of the magnitude and the direction of the change in user interactions between the control version A 234 and the treatment version B 234 of the first service 230 during the first time period. The first weight parameter $c_1$ may be indicative of a relative contribution of the first control metric parameter $M_{1A}$ in the combined control metric $M_{CA}$ parameter and the first treatment metric parameter $M_{1B}$ in the combined treatment metric parameter $M_{CB}$, the second weight parameter $c_2$ may be indicative of a relative contribution of the second control metric parameter $M_{2A}$ in the combined control metric parameter $M_{CA}$ and the second treatment metric parameter $M_{2B}$ in the combined treatment metric parameter $M_{CB}$. The computing the first weight parameter $c_1$ and the second weight parameter $c_2$ may be executed using formulas (1)-(5), and using, as an example, the BFGS algorithm to find the optimal solutions.

The first weight $c_1$ and the second weight $c_2$ may then be used in the new combined metric parameter $M_c$. $(u)=c_1 \cdot M_1(u)+c_2 \cdot M_2(u)$ to measure user interactions on a new set of data to determine the magnitude and the direction of the change in the user interactions of the new set of user data. As a non-limiting example, with weights $c_1=0.3$, $c_2=0.7$, the combined metric parameter may be $M_c(u)=0.3 \cdot DAU(u)+0.7 \cdot CTR(u)$ for a given user U. The combined metric parameter may then be used as a new metric to measure user interaction on a new control version and treatment version (not depicted) of a computer-implemented service (i.e. the first service 230), the combined metric parameter having directionality and sensitivity, thus allowing to detect the magnitude and the direction of the change in the user interactions between the control version A 234 and the treatment version B 238.

The method 300 may then end.

While the above-described implementations have been described and shown with reference to particular steps performed in a particular order, it will be understood that these steps may be combined, sub-divided, or re-ordered without departing from the teachings of the present technology. Accordingly, the order and grouping of the steps is not a limitation of the present technology.

It should be expressly understood that not all technical effects mentioned herein need to be enjoyed in each and every implementation of the present technology. For example, implementations of the present technology may be implemented without the user enjoying some of these technical effects, while other implementations may be implemented with the user enjoying other technical effects or none at all.

Some of these steps and signal sending-receiving are well known in the art and, as such, have been omitted in certain portions of this description for the sake of simplicity. The signals can be sent-received using optical means (such as a fibre-optic connection), electronic means (such as using wired or wireless connection), and mechanical means (such as pressure-based, temperature based or any other suitable physical parameter based).

Modifications and improvements to the above-described implementations of the present technology may become apparent to those skilled in the art. The foregoing description is intended to be exemplary rather than limiting. The scope of the present technology is therefore intended to be limited solely by the scope of the appended claims.

What is claimed is:

1. A computer-implemented method of generating a combined metric parameter, the combined metric parameter usable for executing computer-implemented A/B testing of a computer-implemented service, the computer-implemented service having a control version and a treatment version, the method executed on a hardware server, the method comprising:

receiving, by the hardware server, a set of data, the set of data including a first plurality of feature vectors and a second plurality of feature vectors, the first plurality of feature vectors being associated with user interactions of a first plurality of users with the control version of the computer-implemented service during a first time period, and the second plurality of feature vectors being associated with user interactions of a second plurality of users with the treatment version of the computer-implemented service during the first time period;

acquiring, by the hardware server, a first control metric parameter for the first plurality of feature vectors and a first treatment metric parameter for the second plurality of feature vectors, a combination of the first control metric parameter and the first treatment metric parameter being at least partially indicative of a direction of a change in user interactions between the control version and the treatment version of the computer-implemented service, the direction being one of a negative direction and a positive direction;

acquiring, by the hardware server, a second control metric parameter for the first plurality of feature vectors and a second treatment metric parameter for the second plurality of feature vectors, a combination of the second control metric parameter and the second treatment metric parameter being at least partially indicative of a magnitude of the change in the user interactions between the control version and the treatment version of the computer-implemented service;

generating, by the hardware server, a combined control metric parameter and a combined treatment metric parameter, the generating comprising:

computing by the hardware server, a first weight parameter weighing respectively the first control metric parameter and the first treatment metric parameter and a second weight parameter weighing respectively the second control metric parameter and the second treatment metric parameter, the computing of the first weight parameter and the second weight parameter further comprising:

computing, by the hardware server, for each unit of time in the first time period, a sign of a difference between the first treatment metric parameter and the first control treatment parameter, the sign of the difference being indicative of the direction of the change in the user interactions between the control version and the treatment version of the computer-implemented service, the direction being one of the negative direction and the positive direction, the sign of the difference being defined by:

$$\Delta_i = \text{sign}(M_{1Bi} - M_{1Ai})$$

where $M_{1Ai}$ is the first control metric parameter and $M_{1Bi}$ is the first treatment metric parameter;

selecting, by the hardware server, a minimal first weight parameter and a maximal second weight parameter;

the combined control metric parameter including the first control metric parameter being weighted by the first weight parameter and the second control metric parameter being weighted by the second weight parameter, the combined treatment metric parameter including the first treatment metric parameter being weighted by the first weight parameter and the second treatment metric parameter being weighted by the second weight parameter, the combination of the combined control metric parameter and the combined treatment metric parameter being simultaneously at least partially indicative of the magnitude and the direction of the change in user interactions between the control version and the treatment version of the computer-implemented service during the first time period.

2. The method of claim 1, further comprising: applying, by the hardware server, the combined control metric parameter and the combined treatment metric parameter on a new set of data to determine the magnitude and the direction of the change in the user interactions, the new set of data comprising a third plurality of vectors associated with user interactions on a control version of the computer-implemented service during a second time period and a fourth plurality of vectors being associated with user interactions on a treatment version of the computer-implemented service during a second time period.

3. The method of claim 1, wherein:
the first weight parameter is indicative of a relative contribution of the first control metric parameter in the combined control metric parameter and the first treatment metric parameter in the combined treatment metric parameter; and
the second weight parameter is indicative of a relative contribution of the second control metric parameter in the combined control metric parameter and the second treatment metric parameter in the combined treatment metric parameter.

4. The method of claim 3, wherein the magnitude and the direction of the change in the user interactions between the control version and the treatment version of the computer-implemented service during the first time period has a known magnitude and a known direction.

5. The method of claim 4, further comprising: computing, by the hardware server, for the each unit of the first time period, a weighted z-score based on the combined control metric parameter and the combined treatment metric parameter, the weighted z-score being indicative of a confidence level in the magnitude of the change in the user interactions between the control version and the treatment version of the computer-implemented service, the weighted z-score being defined by:

$$Z_{AB_i}(c_1, c_2) = \frac{c^T \cdot M_{CA}^i - c^T \cdot M_{CB}^i}{\sqrt{c^T \cdot COV_A^i \cdot c + c^T \cdot COV_B^i \cdot c}}$$

where
c is a weight vector including the first weight parameter $c_1$ and the second weight parameter $c_2$;
$M_{CA}$ is the combined control metric parameter and $M_{CB}$ is the combined treatment metric parameter; and
$COV_A^i$ is a covariance matrix between the first control metric parameter and the second control metric parameter and $COV_B^i$ is the covariance matrix between the first treatment metric parameter and the second treatment metric parameter.

6. The method of claim 5, further comprising summing, for the first time period, the sign of the difference between the first treatment metric parameter and the first control treatment parameter multiplied by the weighted z-score for each unit of time in the first time period.

7. The method of claim 6, wherein the computing, by the hardware server, the first weight parameter and the second weight parameter further comprises solving:

$$\sum_{i=1}^{N} Z_{AB_i}(c_1, c_2) \cdot \text{sign}(M_{1B_i} - M_{1A_i}) = \frac{\text{avg}(M_{CB}) - \text{avg}(M_{CA})}{\sqrt{\text{var}[\text{avg}(M_{CB}) - \text{avg}(M_{CA})]}}.$$

8. The method of claim 7, wherein the solving is performed by using one of a Broyden-Fletcher-Goldfard-Shanno (BFGS) algorithm, a gradient based algorithm or a heuristic algorithm.

9. The method of claim 8, wherein a sum of the first weight parameter and the second weight parameter is a constant.

10. The method of claim 9, wherein the selecting, by the hardware server, the minimal first weight parameter and the maximal second weight parameter comprises selecting an optimal value for the minimal first weight parameter and selecting the maximal second weight parameter by subtracting the first weight parameter from the constant.

11. The method of claim 10, wherein one of the first control metric parameter and the first treatment metric parameter is a daily active users (DAU) measure and one of the second control metric parameter and the second treatment metric parameter is a click-through rate (CTR) measure.

12. The method of claim 1, wherein:
the first plurality of users is at least a portion of users having interacted with the control version of the computer-implemented service during the first time period.

13. The method of claim 1, wherein:
the second plurality of users is at least a portion of all users having interacted with the treatment version of the computer-implemented service during the first time period.

14. A system for generating a combined metric parameter, the combined metric parameter usable for executing computer-implemented A/B testing of a computer-implemented service, the computer-implemented service having a control version and a treatment version, the system comprising:
a hardware processor; and
a non-transitory computer-readable medium comprising instructions,
the hardware processor, upon executing the instructions, being configured to cause:
receiving a set of data, the set of data including a first plurality of feature vectors and a second plurality of feature vectors, the first plurality of feature vectors being associated with user interactions of a first plurality of users with the control version of the computer-implemented service during a first time period, and the second plurality of feature vectors being associated with user interactions of a second plurality of users with the treatment version of the computer-implemented service during the first time period;

acquiring a first control metric parameter for the first plurality of feature vectors and a first treatment metric parameter for the second plurality of feature vectors, a combination of the first control metric parameter and the first treatment metric parameter being at least partially indicative of a direction of a change in user interactions between the control version and the treatment version of the computer-implemented service, the direction being one of a negative direction and a positive direction;

acquiring a second control metric parameter for the first plurality of feature vectors and a second treatment metric parameter for the second plurality of feature vectors, a combination of the second control metric parameter and the second treatment metric parameter being at least partially indicative of a magnitude of the change in the user interactions between the control version and the treatment version of the computer-implemented service;

generating a combined control metric parameter and a combined treatment metric parameter, the generating comprising:

computing a first weight parameter weighing respectively the first control metric parameter and the first treatment metric parameter and a second weight parameter weighing respectively the second control metric parameter and the second treatment metric parameter, the computing of the first weight parameter and the second weight parameter further comprising:

computing, for each unit of time in the first time period, a sign of a difference between the first treatment metric parameter and the first control treatment parameter, the sign of the difference being indicative of the direction of the change in the user interactions between the control version and the treatment version of the computer-implemented service, the direction being one of the negative direction and the positive direction, the sign of the difference being defined by:

$$\Delta_i = \text{sign}(M_{1_{Bi}} - M_{1_{Ai}})$$

where $M_{1_{Ai}}$ is the first control metric parameter and $M_{1_{Bi}}$ is the first treatment metric parameter;

selecting a minimal first weight parameter and a maximal second weight parameter;

the combined control metric parameter including the first control metric parameter being weighted by the first weight parameter and the second control metric parameter being weighted by the second weight parameter, the combined treatment metric parameter including the first treatment metric parameter being weighted by the first weight parameter and the second treatment metric parameter being weighted by the second weight parameter, the combination of the combined control metric parameter and the combined treatment metric parameter being simultaneously at least partially indicative of the magnitude and the direction of the change in user interactions between the control version and the treatment version of the computer-implemented service during the first time period.

15. The system of claim 14, wherein the hardware processor is further configured, upon the execution of the instructions, to cause:

applying the combined control metric parameter and the combined treatment metric parameter on a new set of data to determine the magnitude and the direction of the change in the user interactions, the new set of data comprising a third plurality of vectors associated with user interactions on a control version of the computer-implemented service during a second time period and a fourth plurality of vectors being associated with user interactions on a treatment version of the computer-implemented service during a second time period.

16. The system of claim 15, wherein:

the first weight parameter is indicative of a relative contribution of the first control metric parameter in the combined control metric parameter and the first treatment metric parameter in the combined treatment metric parameter; and the second weight parameter is indicative of a relative contribution of the second control metric parameter in the combined control metric parameter and the second treatment metric parameter in the combined treatment metric parameter.

17. The system of claim 16, wherein:

the magnitude and the direction of the change in the user interactions between the control version and the treatment version of the computer-implemented service during the first time period has a known magnitude and a known direction.

18. The system of claim 17, wherein the hardware processor is further configured, upon the execution of the instructions, to cause:

computing for the each unit of the first time period, a weighted z-score based on the combined control metric parameter and the combined treatment metric parameter, the weighted z-score being indicative of a confidence level in the magnitude of the change in the user interactions between the control version and the treatment version of the computer-implemented service, the weighted z-score being defined by:

$$Z_{AB_i}(c_1, c_2) = \frac{c^T \cdot M_{CA}^i - c^T \cdot M_{CB}^i}{\sqrt{c^T \cdot \text{COV}_A^i \cdot c + c^T \cdot \text{COV}_B^i \cdot c}},$$

where:

c is a weight vector including the first weight parameter $c_1$ and the second weight parameter $c_2$;

$M_{CA}$ is the combined control metric parameter and $M_{CB}$ is the combined treatment metric parameter; and $\text{COV}_A^i$ is a covariance matrix between the first control metric parameter and the second control metric parameter and $\text{COV}_B^i$ is the covariance matrix between the first treatment metric parameter and the second treatment metric parameter.

19. The system of claim 18, wherein the hardware processor is further configured, upon the execution of the instructions, to cause:

summing, for the first time period, the sign of the difference between the first treatment metric parameter and the first control treatment parameter multiplied by the weighted z-score for each unit of time in the first time period; and wherein the computing the first weight parameter and the second weight parameter further comprises solving:

$$\sum_{i=1}^{N} Z_{AB_i}(c_1, c_2) \cdot \text{sign}(M_{1_{B_i}} - M_{1_{A_i}}) = \frac{\text{avg}(M_{CB}) - \text{avg}(M_{CA})}{\sqrt{\text{var}[\text{avg}(M_{CB}) - \text{avg}(M_{CA})]}}.$$

\* \* \* \* \*